United States Patent
MacInnis et al.

(10) Patent No.: US 8,165,155 B2
(45) Date of Patent: Apr. 24, 2012

(54) METHOD AND SYSTEM FOR A THIN CLIENT AND BLADE ARCHITECTURE

(75) Inventors: Alexander MacInnis, Lake Oswego, OR (US); Uri El Zur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1244 days.

(21) Appl. No.: 11/173,568

(22) Filed: Jul. 1, 2005

(65) Prior Publication Data

US 2006/0002427 A1  Jan. 5, 2006

Related U.S. Application Data

(60) Provisional application No. 60/585,360, filed on Jul. 1, 2004.

(51) Int. Cl.
  *H04L 12/16* (2006.01)
  *H04L 12/54* (2006.01)
  *H04L 12/56* (2006.01)
  *G06F 9/00* (2006.01)

(52) U.S. Cl. ........ 370/465; 370/477; 425/146; 425/147; 709/203; 380/217

(58) Field of Classification Search .......... 708/203; 375/240.25; 380/217, 269; 709/203; 725/87, 725/109, 143–148; 370/465, 466, 477
See application file for complete search history.

(56) References Cited

U.S. PATENT DOCUMENTS

| | | | |
|---|---|---|---|
| 6,014,694 A * | 1/2000 | Aharoni et al. ............... | 709/219 |
| 6,166,734 A * | 12/2000 | Nahi et al. .................... | 715/748 |
| 6,615,253 B1 * | 9/2003 | Bowman-Amuah .......... | 709/219 |
| 6,757,729 B1 * | 6/2004 | Devarakonda et al. ....... | 709/226 |
| 6,895,480 B2 * | 5/2005 | Heil .............................. | 711/153 |
| 6,970,909 B2 * | 11/2005 | Schulzrinne .................. | 709/206 |
| 7,966,613 B2 * | 6/2011 | Zur et al. ......................... | 718/1 |
| 2002/0015042 A1 * | 2/2002 | Robotham et al. ............. | 345/581 |
| 2002/0103880 A1 * | 8/2002 | Konetski et al. .............. | 709/218 |
| 2003/0056218 A1 * | 3/2003 | Wingard et al. ................ | 725/46 |
| 2003/0156188 A1 * | 8/2003 | Abrams, Jr. ..................... | 348/51 |
| 2004/0031058 A1 * | 2/2004 | Reisman ........................ | 725/112 |
| 2004/0045030 A1 * | 3/2004 | Reynolds et al. ............. | 725/110 |
| 2004/0240752 A1 * | 12/2004 | Dobbs et al. .................. | 382/276 |
| 2005/0210167 A1 * | 9/2005 | Kamphausen et al. ......... | 710/62 |
| 2007/0005795 A1 * | 1/2007 | Gonzalez ....................... | 709/232 |
| 2007/0143801 A1 * | 6/2007 | Madonna et al. ............... | 725/80 |
| 2008/0175324 A1 * | 7/2008 | Belknap et al. .......... | 375/240.25 |

* cited by examiner

*Primary Examiner* — Chi Pham
*Assistant Examiner* — Ahmed Elallam
(74) *Attorney, Agent, or Firm* — Thomas, Kayden, Horstemeyer & Risley, LLP

(57) ABSTRACT

In a computing system, a method and system for a thin client and blade architecture are provided. A blade may generate video, audio, and peripheral control information that may be transmitted to a thin client (TC) by utilizing a video encoder, an audio bridge, and a peripheral bridge. Communication between the blade and the TC may occur based on a communication protocol that may operate independently of an operating system and/or applications running on the blade. The video encoder may dynamically compress the video information according to network capacity and/or video content and may dynamically select from various compression algorithms. The blade may configure and manage operations that interface with the TC. The TC may comprise a video decoder, a transceiver, a processor, a video display bridge, an audio bridge, and a peripheral bridge and may be adapted to communicate with peripheral devices.

30 Claims, 12 Drawing Sheets

METHOD AND SYSTEM FOR A THIN CLIENT AND BLADE ARCHITECTURE

CROSS-REFERENCE TO RELATED APPLICATIONS/INCORPORATION BY REFERENCE

This patent application makes reference to, claims priority to and claims benefit from U.S. Provisional Patent Application Ser. No. 60/585,360 filed on Jul. 1, 2004.

The above stated application is hereby incorporated herein by reference in its entirety.

FIELD OF THE INVENTION

Certain embodiments of the invention relate to computing architectures. More specifically, certain embodiments of the invention relate to a method and system for a thin client and blade architecture.

BACKGROUND OF THE INVENTION

The ability to provide cost effective, flexible, reliable, secure, and high-performing enterprise computing systems has become an important goal of many corporate, educational, and governmental institutions. In this regard, new computing architectures are being developed in order to achieve both lower operating expenses and lower capital expenses in PC enterprise systems. For example, new architectures may utilize desktop PCs that support reduced processing capabilities while transferring the more processing intensive operations to another machine or processing device, for instance a blade board, hereinafter blade, generally located in a remote server or a remote machine with a different form factor. These desktop PCs, also referred to as thin client (TC) machines, may utilize an operating system (OS), such as Windows CE, for example, that may be optimized to perform local tasks while the blade may utilize a more powerful operating system capable of supporting large software applications. In this regard, a blade may be utilized to provide system and application support to one or several TC machines, realizing a lower cost structure for enterprise computing systems. Traditionally, blade/TC architectures have been aimed at task-based workers operating in places such as call centers, hospitals, technology companies, and/or financial institutions. However, the cost benefits of a blade/TC architecture make it an attractive alternative in many other public and/or private environments including, for example, consumer market for residential use.

Blade/TC architectures may also improve the ability to provide enterprise computing protection by centralizing security operations and/or routines at the blade while utilizing an operating system at the TC machine that is less prone to security breaches, for example. Similarly, the centralized blade/TC architecture may perform easier updates, additions, and/or removal of software applications and/or the operating systems that support those software applications at the blade. Moreover, higher reliability may be achieved through centralized backup systems also implemented at the blade. However, in some instances, a blade/TC architecture may be vulnerable to security breaches and a robust protection scheme may need to be implemented to enable its effective operation.

In order for a TC machine and the blade to coordinate operations, the TC machine operating system and the blade operating system may utilize a common protocol. For example, some Windows-based operating systems may support a native Microsoft Remote Desktop Protocol (RDP) as well as a Citrix Independent Computing Architecture (ICA) protocol. In this regard, the RDP or ICA protocols may be utilized to intercept many of the functions and/or commands that would otherwise be performed locally by the TC machine operating system and transfer them to the blade operating system for processing. However, this may require compatibility between the common protocol and the operating systems in the TC machine and the blade. Any modifications, changes, and/or updates to the common protocol must be such that compatibility is maintained between the common protocol and the operating systems. Moreover, because operating systems that are not compatible with the common protocol may not be utilized, blade/TC architectures may be limited in flexibility and in the cost benefits that they are intended to provide.

As applications are added or simply migrate from one version of the OS to a new version or as new features in the OS become available, the protocol may not support or may not fully support these new applications, OS or features. In some instances, for example with ICA, there may be a need to access both the TC and the blade to install new applications. Moreover, in some instances, the protocol may not support the functionality that may be available to a local user, for example, audio support.

The changes, modifications, and/or updates to the common protocol may be a result of updates to the blade and/or the TC machine operating system, for example. In some instances, when a TC machine is adapted to run an operating system, updating the operating system in the TC machine may also require upgrades to the TC machine hardware. These hardware upgrades may result in large capital and/or maintenance expenses in enterprise computing systems that comprise many TC machines. New blade/TC architectures may be needed that further reduce the operating and maintenance cost of enterprise computing systems by requiring minimal hardware upgrades while also providing flexibility in the selection of operating systems and/or software applications that may be supported by the blade.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a thin client and blade architecture, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a thin client and blade architecture. In accordance with an embodiment of the invention, a blade or server blade or a machine with a different form factor may be utilized to generate video, audio, and peripheral control information that may be transmitted to a thin client (TC) machine by utilizing a video encoder, an audio bridge, and/or a peripheral bridge. The server blade may comprise a blade transceiver that may be utilized to communicate with the TC machine. Communication between the blade and the TC machine may occur based on a communication protocol that may operate independently of an operating system and/or applications running on the blade. In this regard, the network between a server blade and a TC machine may be, for example, an Ethernet or Gigabit Ethernet network operating in Layer 2 that utilizes Transmission Control Protocol/Internet Protocol (TCP/IP) operating in Layers 3 and 4.

The video encoder in the server blade may be adapted to dynamically compress the video information according to currently available network capacity and/or other criteria, such as video content, for example. Moreover, the video encoder may dynamically select from a plurality of compression algorithms. Exemplary compression algorithms may comprise MPEG and H.264. The server blade may configure and manage the operations that interface with the TC machine via a local bus, for example. The TC machine may comprise a video decoder, a TC transceiver, a processor, a video display bridge, an audio bridge, and a peripheral bridge. The video decoder in the TC machine may be adapted to decompress and transfer video information to a monitor or display via the video display bridge. The audio and peripheral bridges may be adapted to communicate with peripheral devices supported by the TC machine. In this regard, the peripheral bridge may also be adapted to receive information from the peripheral devices that may be communicated to the blade via the TC transceiver.

Figure 1:
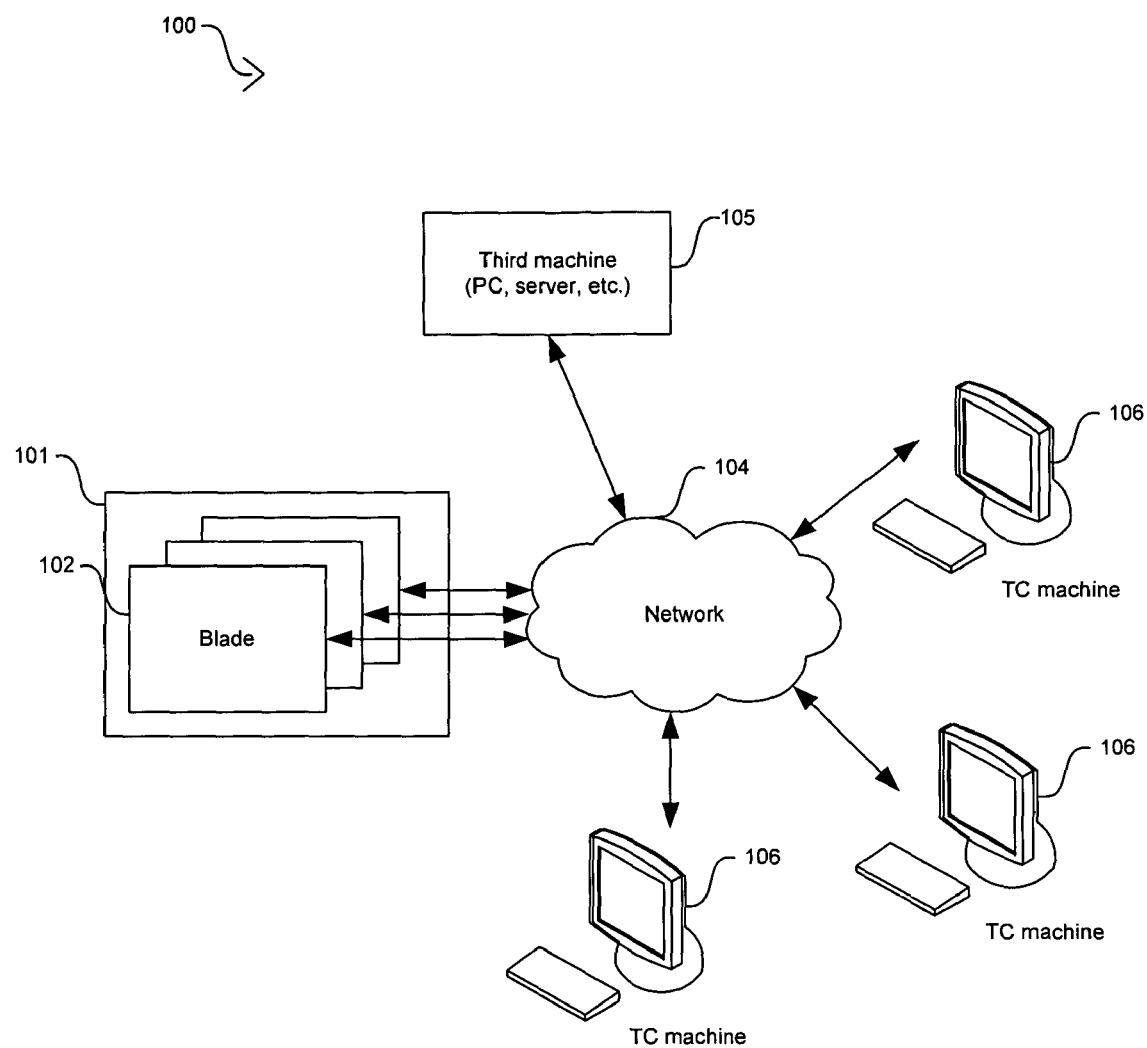
FIG. 1 illustrates an exemplary blade and thin client (TC) architecture, in accordance with an embodiment of the invention.

FIG. 1 illustrates an exemplary blade and TC architecture, in accordance with an embodiment of the invention. Referring to FIG. 1, a blade/TC architecture 100 may comprise a blade server 101 comprising at least one server blade 102, a network 104, at least one TC machine 106, and a third machine 105. The server blade 102 may comprise suitable hardware, logic, circuitry, and/or code that may be adapted to run operating systems and/or software applications for support of activities that may be performed by users of the TC machines 106. In this regard, the server blade 102 may correspond to a processing device, such as a PC or a server, which may be adapted to run operating systems and/or software applications. The server blade 102 may utilize a native operating system (OS) and may be adapted to support more than one TC machine 106. The native OS and the software applications on the server blade 102 may be updated when updates and/or new releases become available. Moreover, software applications may be added and/or removed in accordance with the activities that may be performed by the users of the TC machines 106. A bank of server blades 102 housed within a server may be referred to as a blade server 101. The implementation of the server blades 102 or other substantially similar processing devices need not be limited to the embodiment described in FIG. 1.

The server blade 102 may also be adapted to perform security, backup, and/or maintenance functions, for example, in support of the activities performed by users of the TC machines 106. For example, the server blade 102 may utilize an independent host function to provide permissions for requests to install peripheral devices by a TC machine 106. When the server blade 102 grants the permission, the TC machine 106 may proceed to mount or connect to the peripheral device. In this regard, the TC machine 106 may support operations that identify the presence of peripheral devices, such as those provided by the Universal Serial Bus (USB) standard while the server blade 102 may utilize the identifying information to determine whether installation of the peripheral device may be permitted. In some instances, the security, backup, and/or maintenance functions may be performed by a server blade 102 in a blade server 101 or by the third machine 105 that may be communicatively coupled to the server blade 102 via the network 104. In this regard, the third machine 105 may correspond to a PC or a server, for example, which may be adapted to support security, backup, and/or maintenance functions.

The server blade 102 may also be adapted to support all graphics and/or video generation for the TC machines 106. In this regard, video information may refer to video and/or graphics generated by the server blade 102. The server blade 102 may be adapted to compress video information and to transfer the compressed video information to the TC machine 106 via the network 104. The compression of video information may be dynamic, configurable, and/or may scale in accordance with available network capacity and/or video content. In this regard, the server blade 102 may select from at least one compression algorithm when compressing the video information.

Multiple server blades 102, for example, in a blade server 101, may be utilized by the blade/TC architecture 100 to support the activities of multiple TC machines 106. For example, when at least a portion of the functionality of a server blade 102 fails and/or malfunctions, another server blade 102 may be utilized as a backup to support the activities of the TC machines 106 that had been supported by the failing and/or malfunctioning server blade 102. In some instances, the server blade 102 may be located in a server in a data center, for example. A ratio of one TC machine 106 to one server blade 102 may not provide sufficient processing centralization but may provide sufficient storage centralization. Server blades 102 may access common storage devices, such as hard disks, via iSCSI boot, for example, to achieve centralized storage with advantages in fail over and/or redirecting, for example. Moreover, the hard disks may be centrally managed as a server blade 102 may utilize iSCSI and/or iSCSI boot to access boot code, OS, and/or application code, for example.

The network 104 may comprise suitable hardware, logic, circuitry, and/or code that may be adapted to communicate between at least one server blade 102, and/or at least one TC machine 106. In some instances, additional hardware, such as one or more third machines 105 adapted to handle security, backup, and/or maintenance functions, for example, may also communicate with at least one server blade 102 and/or at least one TC machine 102 via the network 104. The third machine 105 may be integrated into the server blade 102. The third machine 105 may be utilized to grant access to the server blade 102 via the network 104 upon a request from a TC machine 106. The third machine 105 may also be adapted to re-assign a TC machine 106 to a new server blade 102 when a failure event takes place, for example. Moreover, the third machine 105 may be adapted to assign a server blade 102 to a new hard disk when centralized storage is supported and/or to assign server blades 102 to a boot disk that determines what OS and application that server blade 102 may support. The third machine 105 may also be adapted to authenticate users on the TC machine 106, after the TC machine 106 has been granted access to the network 104 and/or to a server blade 102. The third machine 105 may also obtain network topology information that may be utilized for audio and/or video compression. The third machine 105 may also be adapted to collect configuration and/or capabilities information from the TC machines 106 and may also be used to collect different version information from the TC machines 106. The different versions may indicate different capabilities and/or the ability to support various versions of the protocol between a server blade 102 and a TC machine 106. In some instances, the server blade 102 may adopt compression techniques or protocol version usage or other parameters based at least in part on version information from the TC machines 106 and/or from the server blade 102.

The capacity of the network 104 may vary in response to the traffic that results from the activities performed by the TC machines 106 and/or the activities of other devices that may also be utilizing the network 104. The network 104 may be, for example, an Ethernet or Gigabit Ethernet network operating in Layer 2 that utilizes Transmission Control Protocol/Internet Protocol (TCP/IP) operating in Layers 3 and 4. In this regard, devices connected to the network 104 may comprise an address known as a Medium Access Control (MAC) address that may be utilized to identify that device from among other devices connected to the network 104. In accordance with an embodiment of the invention, a physical (PHY) layer supported by the network 104 may correspond to a communication protocol that may utilize wireline and/or wireless physical connections. The blades 102 and TC machines 106 may be connected to the network 104 via wireless and/or wired connections.

The TC machine 106 may comprise suitable hardware, logic, circuitry, and/or code that may be adapted to receive and/or transmit information from at least one server blade 102 and/or from at least one peripheral device connected or coupled to the TC machine 106 and may be adapted to communicate with the third machine 105 for authentication and/or assignment to a server blade 102, for example. The TC machine 106 may be adapted to receive compressed video information from the server blade 102 and to decompress the compressed video information before transferring the video information to a peripheral device for display. Peripheral devices may comprise devices that allow the user to provide information, that is, peripheral input information, to the TC machine 106 and/or allow the user to receive information, that is, peripheral output information, from the TC machine 106. The TC machine 106 may be adapted to operate based on firmware and/or with an embedded operating system, for example, a real time operating system (RTOS) or embedded Linux. In some instances, the firmware and/or embedded operating system may be updated via the network 104, for example. The TC machine may be adapted to communicate with at least one server blade 102 based on a communication protocol that may operate independently of an operating system and/or applications running on the server blade 102. In accordance with various embodiments of the invention, the communication protocol may be adapted to operate independently of the firmware and/or embedded operating systems running on the TC machine.

In operation, the user may start up a TC machine 106, which may utilize a built-in configuration for initiating its operations. In this regard, firmware in the TC machine 106 may be utilized for operations that control the activities of the TC machine 106, including start-up operations, shutdown operations, and normal operations, for example. The TC machine 106 may communicate with a server blade 102 via the network 104 to request and/or receive video, audio, and/or peripheral output information to provide to the user. The user may also provide peripheral input information that may be communicated or transferred to the server blade 102 via the network 104.

The server blade 102 may communicate or transfer the appropriate video, audio, and/or peripheral output information to the TC machine 106. The TC machine 106 may transfer the video, audio, and/or peripheral output information to corresponding peripheral devices remotely communicatively coupled to the TC machine 106. In case of a failure, malfunction, and/or maintenance operation, the TC machine 106 may communicate with a backup server blade 102. The TC machine 106 may communicate with a configuration manager, for example, the third machine 105, to obtain access to the network 104, and/or to be assigned or re-assigned to a server blade 102.

Figure 2A:
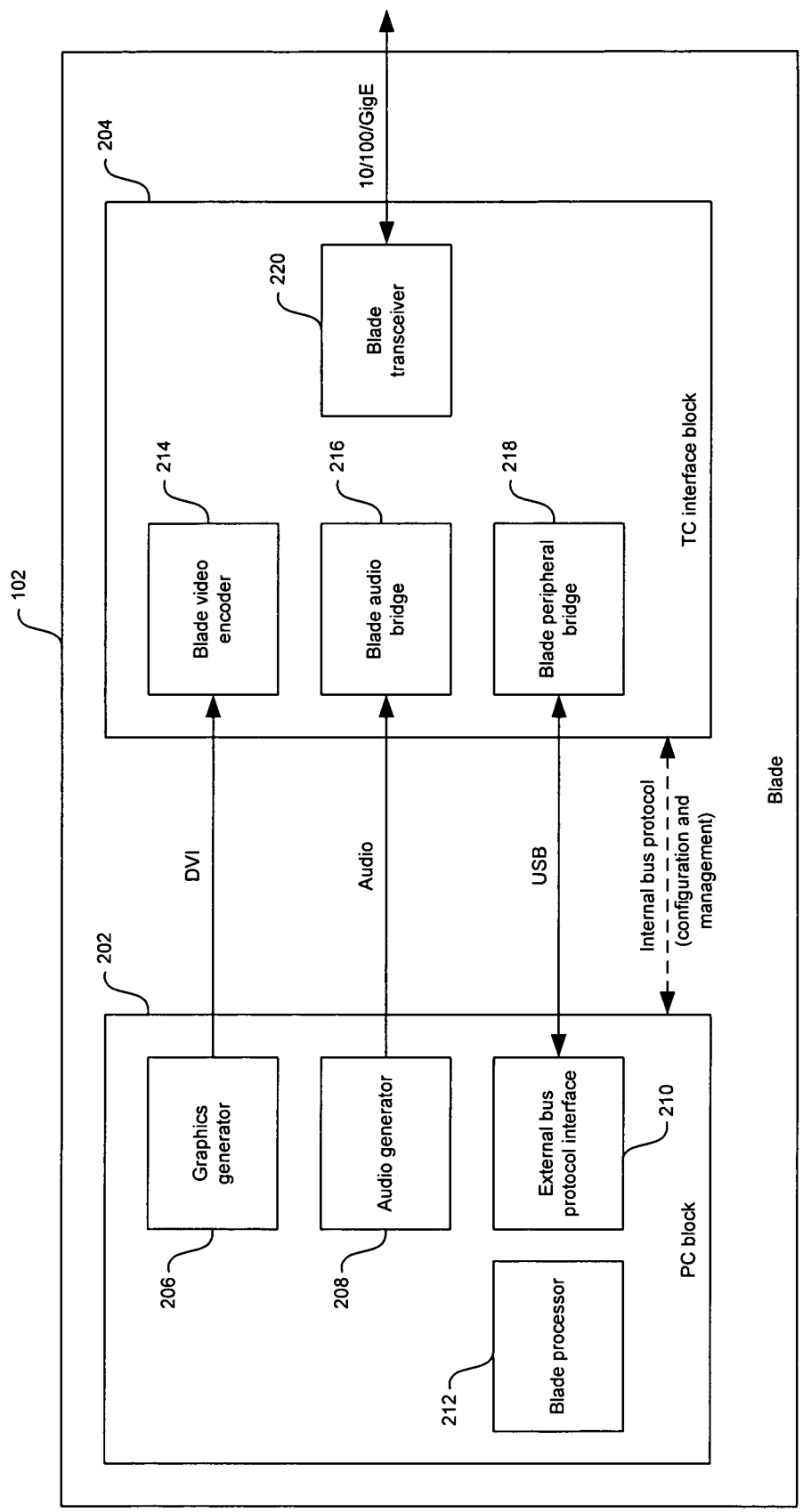
FIG. 2A is a block diagram of an exemplary blade implementation with an integrated transceiver, in accordance with an embodiment of the invention.

FIG. 2A is a block diagram of an exemplary blade implementation with an integrated transceiver, in accordance with an embodiment of the invention. Referring to FIG. 2A, the server blade 102 in FIG. 1 may comprise a PC block 202 and a TC interface block 204. The PC block 202 may comprise a blade processor 212, a graphics generator 206, an audio generator 208, and an external bus protocol interface 210. The TC interface block 204 may comprise a blade video encoder 214, a blade audio bridge 216, a blade peripheral bridge 218, and a blade transceiver 220. The TC interface block 204 may be adapted to operate without intercepting graphic calls generated by the PC block 202.

The blade processor 212 may comprise suitable logic, circuitry, and/or code that may be adapted to execute or run at least a portion of the blade operating system. Moreover, the blade processor 212 may execute or run software applications that may be adapted to run with the blade operating system. The blade processor 212 may also be adapted to utilize an internal bus protocol to configure and/or manage the operations of the TC interface block 204. For example, the blade processor 212 may utilize the Peripheral Component Interconnect (PCI) local bus, the USB, and/or the Industry Standard Architecture (ISA) bus to configure and/or manage the TC interface block 204. The blade processor 212 may also be adapted to communicate with processors and/or devices in other blades 102 in order to provide system level functionalities such as security, backup, and/or distributed processing, for example. In some instances, the server blade 102 may be adapted to support multiple TC machines 106 with one blade processor 212. In other instances, the server blade 102 may be adapted to support multiple TC machines 106 with multiple blade processors 212.

The graphics generator 206 may comprise suitable logic, circuitry, and/or code that may be adapted to generate video information to be displayed by a TC machine 106 supported by the server blade 102. At least a portion of the video information generated by the graphics generator 206 may result from operations performed by software applications and/or the blade operating system. The graphics generator 206 may also be adapted to transfer the generated video information to the TC interface block 204. The graphics generator 206 may utilize a video information standard format for transferring the video information to the TC interface block 204. For example, the Digital Visual Interface (DVI) format, which supports both analog and digital display devices, may be utilized. In some instances, the graphics generator 206 may communicate or transfer information to the TC interface block 204 via a digital video interface that may support, for example, the DVI format.

The audio generator 208 may comprise suitable logic, circuitry, and/or code that may be adapted to generate audio information that may be utilized by a TC machine 106 supported by the server blade 102. In this regard, at least a portion of the audio information generated by the audio generator 208 may result from operations performed by software applications and/or the blade operating system. The audio generator 208 may also be adapted to transfer the generated audio information to the TC interface block 204.

The external bus protocol interface 210 may comprise suitable logic, circuitry, and/or code that may be adapted to generate peripheral output information that may be utilized by peripheral devices remotely communicatively coupled to a TC machine 206 supported by the server blade 102. Moreover, the external bus protocol interface 210 may also be adapted to receive peripheral input information from the peripheral devices remotely communicatively coupled to a TC machine 206 supported by the server blade 102. In this regard, at least a portion of the peripheral output information generated by the external bus protocol interface 210 may result from operations performed by software applications and/or the OS operating on the server blade 102.

The external bus protocol interface 210 may also be adapted to transfer the generated peripheral output information to the TC interface block 204. The external bus protocol interface 210 may utilize an external bus standard, for example, the USB standard, for transferring peripheral output information to the blade peripheral bridge 218, which in turn forwards the information to a TC machine 106, and for receiving peripheral input information from a TC machine 106 through the blade peripheral bridge 218.

The blade video encoder 214 may comprise suitable logic, circuitry, and/or code that may be adapted to encode or compress the video information generated by the graphics generator 206. In this regard, the blade video encoder 214 may communicate with the graphics generator 206 via a digital video interface that may support, for example, the DVI format. The video compression operation may be dynamic, that is, the encoding operation or encoding algorithm may vary with time in accordance with increases or decreases in traffic level in the network 104. Moreover, the video compression function may also vary dynamically according to the contents of the video information generated by the graphics generator 206 and received by the video encoder 214. When determining the appropriate video compression ratio to be utilized, a desired user experience may be considered. For example, the TC machine 106 user may receive video information from a server blade 102 in a manner that emulates the response of when local processing is utilized. The blade video encoder 214 may also be adapted to transfer the compressed video information to the blade transceiver 220.

The blade audio bridge 216 may comprise suitable logic, circuitry, and/or code that may be adapted to process the audio information generated by the audio generator 216 and to transfer the processed audio information to the blade transceiver 220. The blade audio bridge 216 may adapt and/or modify the format of the audio information generated by the audio generator 216 so that peripheral devices remotely communicatively coupled to a TC machine 106 supported by the server blade 102 may utilize it. In some instances, the audio information may be compressed by the audio generator 208 or by the blade audio bridge 216 before transfer to a TC machine 106.

The blade peripheral bridge 218 may comprise suitable logic, circuitry, and/or code that may be adapted to process the peripheral output information generated by the external bus protocol interface 210 and to transfer the processed peripheral output information to the blade transceiver 220. The blade peripheral bridge 218 may adapt and/or modify the format of the peripheral output information generated by the external bus protocol interface 210 so that peripheral devices remotely communicatively coupled to a TC machine 106 supported by the server blade 102 may utilize it. The blade peripheral bridge 218 may also be adapted to process the peripheral input information received from peripheral devices remotely communicatively coupled to a TC machine 106 supported by the server blade 102, and to transfer the processed peripheral output information to the external bus protocol interface 210. The blade peripheral bridge 218 may adapt and/or modify the format of the peripheral input information received from the peripheral devices so that the external bus protocol interface 210 may utilize it. For example, the external bus protocol interface 210 may be a USB root device and the blade peripheral bridge 218 may present as a typical USB device to it, conforming to the USB protocol. The information conveyed by the USB protocol may be adapted for transport over the network by the blade peripheral bridge 218 before it is sent over the network 104 to the TC machine 106. The TC machine 106 may perform the a similar adaptation before it sends the signals from its local peripherals to the blade peripheral bridge 218.

The blade transceiver 220 may comprise suitable logic, circuitry, and/or code that may be adapted to receive compressed video, audio, and/or peripheral output information and process the received information for transfer to a TC machine 106 supported by the server blade 102. For example, the blade transceiver 220 may adapt and/or modify the format of the received information for transfer utilizing TCP/IP protocol. The blade transceiver 220 may utilize, for example, 10-Ethernet, 100-Ethernet, Gigabit Ethernet (GigE), or higher data rates. In this regard, MAC addresses and PHY layer standard (MAC/PHY) may be utilized for transferring the received information to the appropriate TC machine 106. The blade transceiver 220 may also be adapted to receive peripheral input information from peripheral devices coupled to the TC machines 106 supported by the server blade 102. In this regard, the blade transceiver 220 may adapt and/or modify the format of the received peripheral input information before transfer to the blade peripheral bridge 218. The blade transceiver 220 may utilize a communication protocol that adapts and/or modifies information for communicating with a TC machine 106 that may operate independently of an operating system and/or applications running on the PC block 202.

The TC interface block 204 in FIG. 2A may be implemented in a single integrated circuit (IC) to provide a cost effective solution. Similarly, the PC block 202 may be implemented in a system-on-chip (SOC) IC to provide a cost effective solution. In some instances, the TC interface block 204 and the PC block 202 may be implemented in a SOC IC to further reduce costs and improve operating performance. Moreover, a single PC block 202 may be utilized to support multiple TC interface blocks 204 enabling support for a plurality of TC machines 106 from a single server blade 102.

Figure 2B:
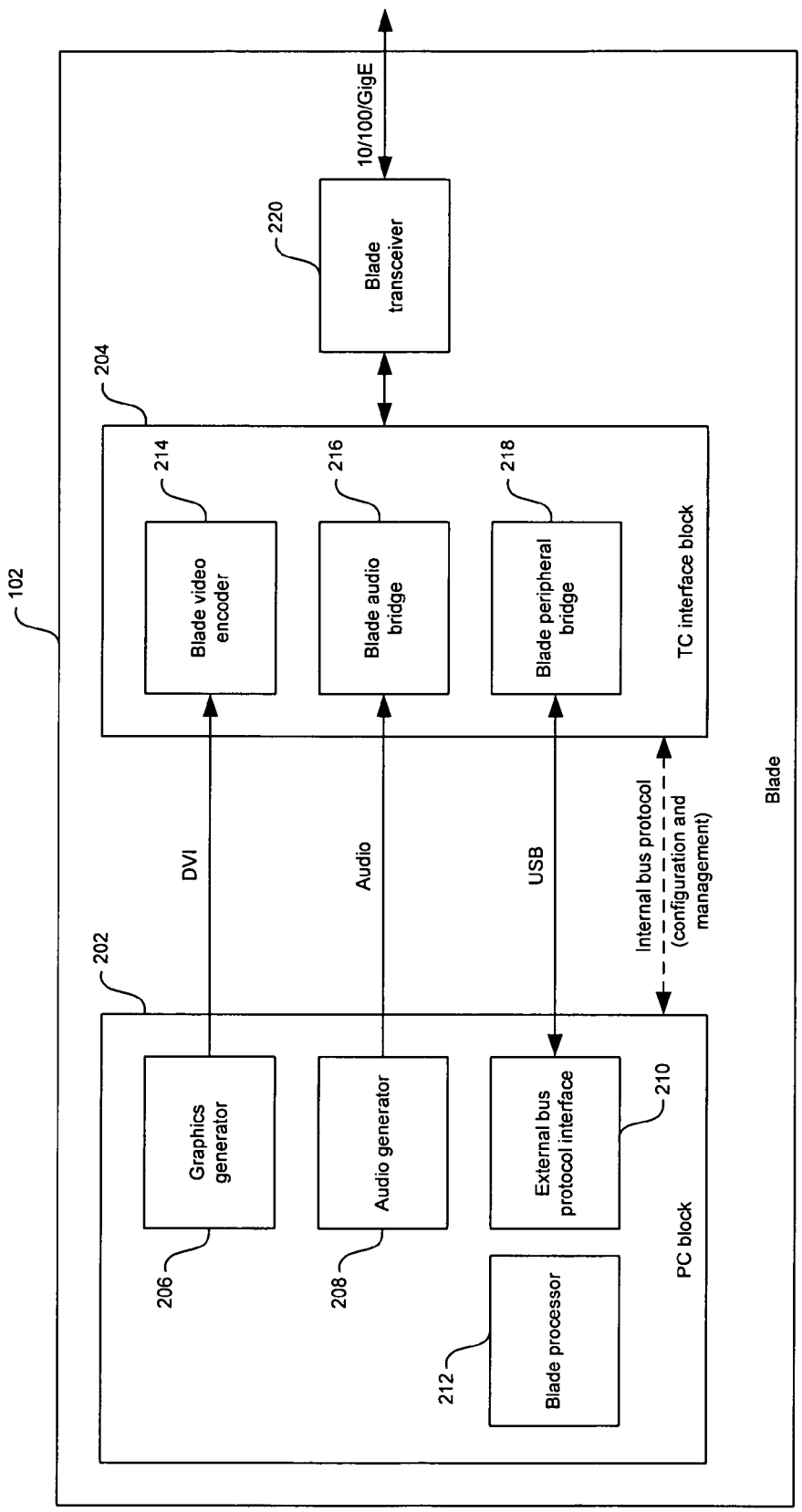
FIG. 2B is a block diagram of an exemplary blade implementation with a separate transceiver, in accordance with an embodiment of the invention.

FIG. 2B is a block diagram of an exemplary blade implementation with a separate transceiver, in accordance with an embodiment of the invention. Referring to FIG. 2B, the server blade 102 in FIG. 2B may differ from the server blade 102 in FIG. 2A in that the blade transceiver 220 may be implemented separate from the TC interface block 204. In such an implementation, the blade transceiver 220 may be adapted to provide both a suitable interface with the TC interface block 204 and with the network 104 in FIG. 1.

The TC interface block 204 in FIG. 2B may be implemented in a single IC to provide a cost effective solution. Similarly, the PC block 202 may be implemented in a SOC IC to provide a cost effective solution. In some instances, the TC interface block 204 and the PC block 202 may be implemented in a SOC IC to further reduce costs and improve operating performance.

In another embodiment of the invention, a single PC block 202 may support a plurality of TC interface blocks 204 and corresponding blade transceivers 220 as described in FIG. 2B enabling support for a plurality of TC machines 106 from a single server blade 102. In this regard, more than one of the TC interface blocks 204 may be implemented in a single IC to provide a cost effective solution. Similarly, more than one of the blade transceivers 220 may be implemented in a single IC to provide a cost effective solution.

Figure 2C:
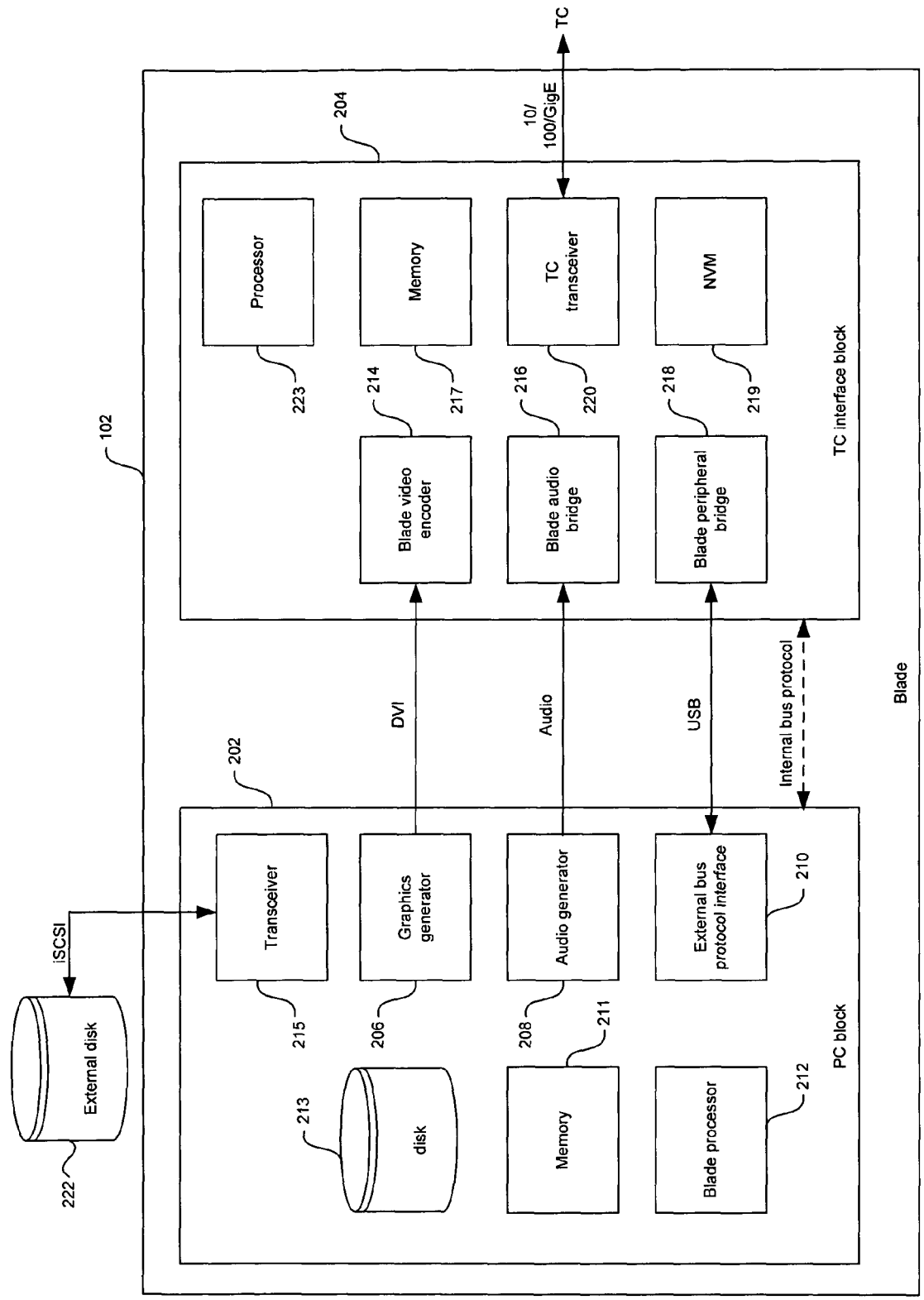
FIG. 2C is a block diagram of an exemplary blade implementation with separate PC block and TC interface transceivers, in accordance with an embodiment of the invention.

FIG. 2C is a block diagram of an exemplary blade implementation with separate PC block and TC interface transceivers, in accordance with an embodiment of the invention. Referring to FIG. 2C, the PC block 202 in FIG. 2A may also comprise a memory 211, a disk 213, and a transceiver 215 which may for example comprise an Ethernet controller. The memory 211 may comprise suitable logic, circuitry, and/or code that may be adapted to store information and/or data utilized and/or generated by the PC block 202 during operation. For example, the memory 211 may be utilized by the blade processor 212 to store information utilized by applications running on the blade processor 212. The disk 213 may comprise suitable logic, circuitry, and/or code that may be adapted to store boot up code, OS, and/or application code, for example. The transceiver 215 may comprise suitable logic, circuitry, and/or code that may be adapted to communicate with external devices such as the external disk 222, for example. In this regard, the transceiver 215 may utilize Internet small computer system interface (iSCSI) and iSCSI boot to transfer data to and from the external disk 222. The external disk 222 may comprise suitable logic, circuitry, and/or code that may be adapted to store boot up code, OS, and/or application code, for example. In some instances, the transceiver 215 may also be adapted to support remote direct memory access (RDMA) to allow real time fail over of an OS and/or application image from one server blade to another, for example.

Referring back to FIG. 2C, the TC interface block 204 in FIG. 2A may also comprise a memory 217, a non-volatile memory (NVM) 219, and a processor 223. The memory 217 may comprise suitable logic, circuitry, and/or code that may be adapted to store information and/or data utilized and/or generated by data processing operations in the TC interface block 204. For example, the blade video encoder 214 may utilize a portion of the memory 217 during video compression operations. The NVM 219 may comprise suitable logic, circuitry, and/or code that may be adapted to store information and/or data that may be available to the TC interface block 202. The processor 223 may comprise suitable logic, circuitry, and/or code that may be adapted to provide control and/or management operations in the TC interface block 204. When multiple TC machines 106 are supported by a server blade 102, the internal bus protocol may be utilized by, for example, the processor 223, to coordinate or manage the information received from the PC block 202 and to appropriately transfer the information to each of the TC machines 106 supported.

Figure 2D:
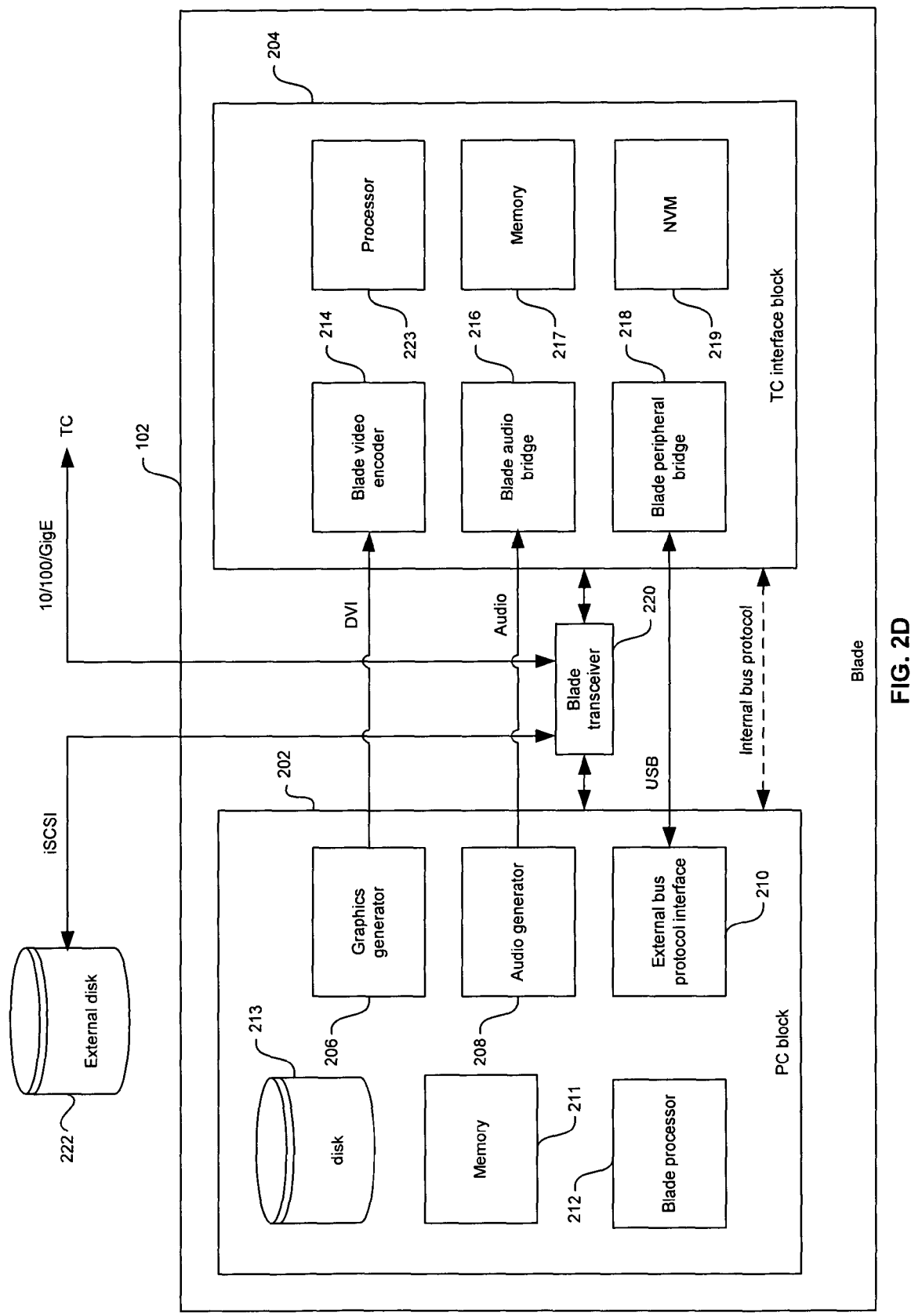
FIG. 2D is a block diagram of an exemplary blade implementation with a common PC block and TC interface transceiver, in accordance with an embodiment of the invention.

FIG. 2D is a block diagram of an exemplary blade implementation with a common PC block and TC interface transceiver, in accordance with an embodiment of the invention. Referring to FIG. 2D, the PC block 202 and the TC interface block 204 may both utilize the blade transceiver 220 in FIG. 2B to communicate with external devices. In this regard, the blade transceiver 220 may be adapted to transfer information and/or data between the external disk 222 and the PC block 202 and may also be adapted to transfer information and/or data between the TC interface block 204 and at least one TC machine 106. Data communication between the external disk 222 and the PC block 202 may be performed via iSCSI and iSCSI boot. In this regard, the blade transceiver 220 may support iSCSI for the storage needs of the PC block 202 and for re-assignment of the OS and/or applications supported by the server blade 102. In some instances, the blade transceiver 220 may also be adapted to support RDMA to allow real time fail over of an OS and/or application image from one server blade to another, for example. Data communication between the TC interface block 204 and at least one TC machine 106 may be performed via 10-Ethernet, 100-Ethernet, Gigabit Ethernet (GigE), or higher data rates, for example.

Figure 2E:
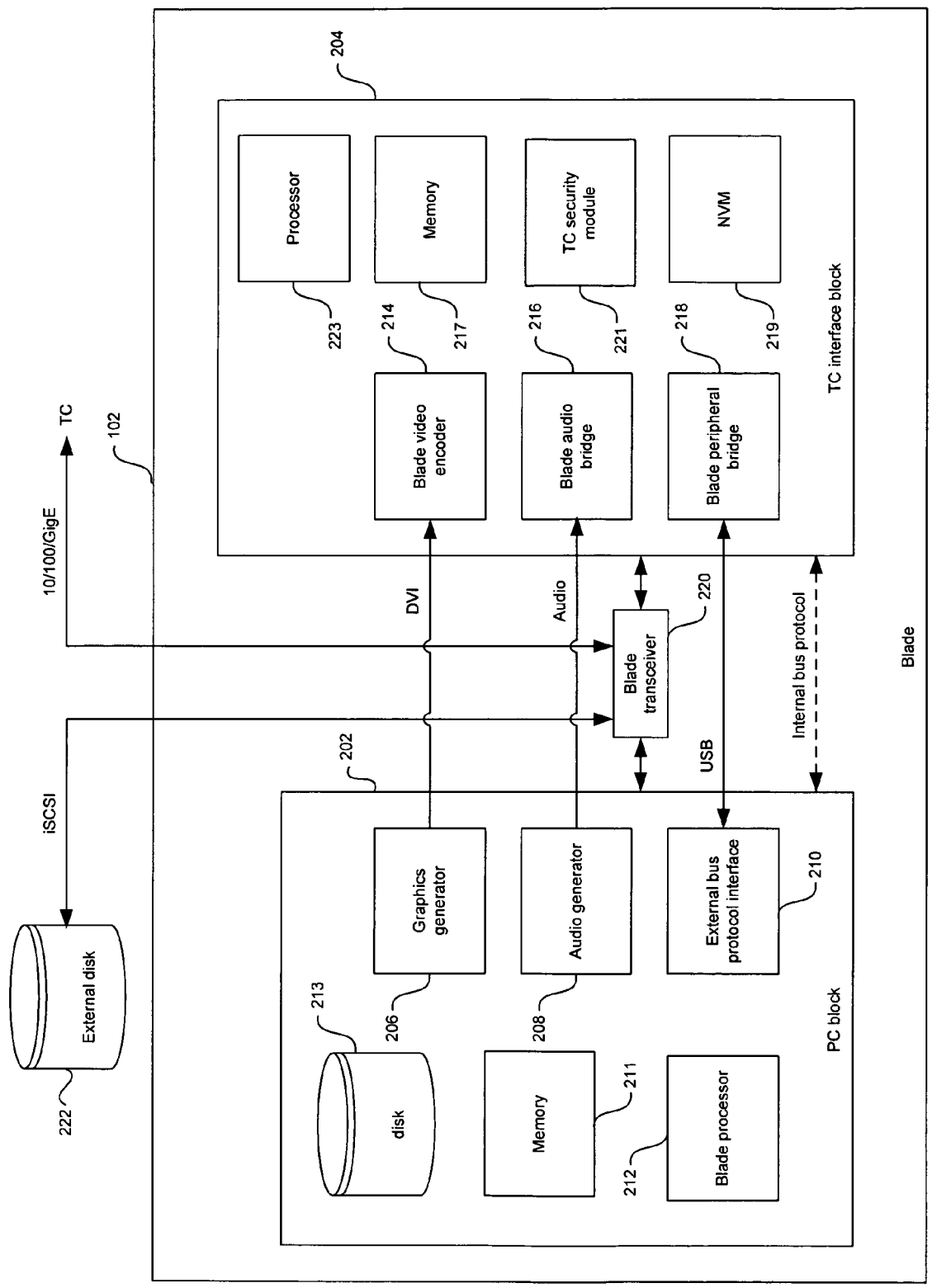
FIG. 2E is a block diagram of an exemplary blade implementation with a security module in the TC interface block, in accordance with an embodiment of the invention.

FIG. 2E is a block diagram of an exemplary blade implementation with a security module in the TC interface block, in accordance with an embodiment of the invention. Referring to FIG. 2E, the TC interface block 204 may also comprise a TC security module 221 that may comprise suitable logic, circuitry, and/or code that may be adapted to provide data security operations, such as encryption and/or encoding operations or authentication or establishing root of trust. In this regard, the TC security module 221 may be adapted to operate in accordance with data security hardware and/or software that may be available in the third machine 105 or/and in TC machines 106. Moreover, the TC security module 221 may be adapted to provide authentication to a TC machine 106 supported by the server blade 102.

Figure 3:
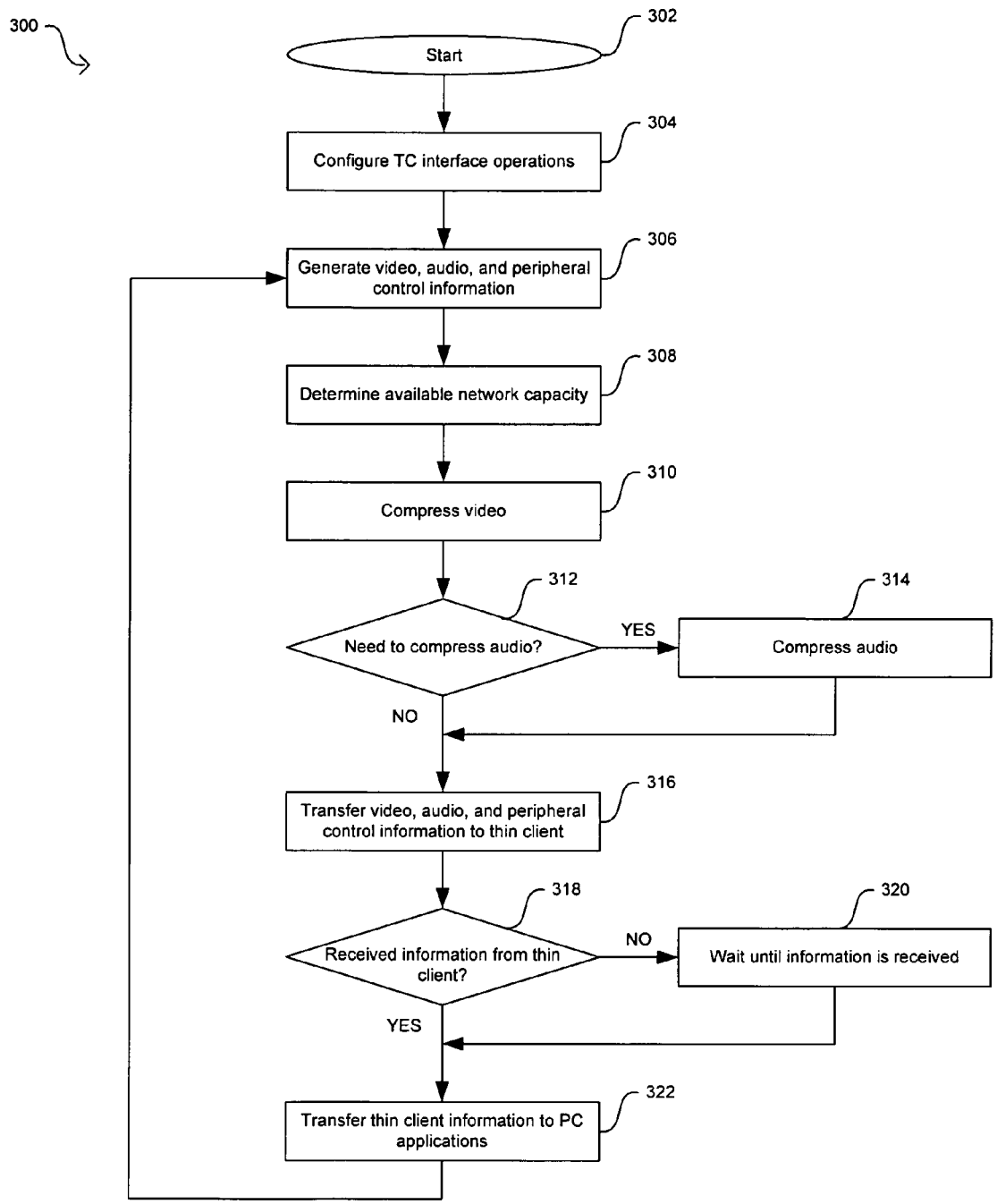
FIG. 3 is a flow diagram illustrating exemplary steps in the operation of the TC interface in a server blade, in accordance with an embodiment of the invention.

FIG. 3 is a flow diagram illustrating exemplary steps in the operation of the TC interface in a server blade, in accordance with an embodiment of the invention. Referring to FIG. 3, after start step 300, in step 302, the processor 223 in the TC interface block 204 may initialize or configure the operations of the TC interface block 204 by accessing the third machine 105 via the network 104 or by accessing configuration information stored in the NVM 219 or by using the internal bus protocol when necessary. For example, the processor 223 may configure the compression of video information and/or the adaptation and/or modification of video, audio, and/or peripheral information. Configuration and/or management of the TC interface block 204 by the processor 223 and/or by the third machine 105 may occur at various instances during the operation of the server blade 102.

In step 306, the graphics generator 206 may generate video information, the audio generator 208 may generate audio information, and/or the external bus protocol interface 210 may generate peripheral output information. In this regard, the video, audio, and/or peripheral information may be generated in accordance with instructions that result from software applications and/or the blade operating system. In step 308, the current network capacity available for transferring information between the server blade 102 and a TC machine 106 supported by the server blade 102 may be determined. In step 310, the blade video encoder 214 may compress or encode the video information generated by the graphics generator 206. The compression of video information may be based on the contents of the video information, the available current network capacity, and/or other criteria.

In step 312, the server blade 102 may be adapted to determine whether any portion of generated audio information may be compressed. When audio information is to be compressed, the flow diagram 300 may proceed to step 314 where either the audio generator 208 or the blade audio bridge 216 have been adapted to perform compression of audio information. When the audio compression is complete, the flow diagram 300 may proceed to step 316. When audio information is not to be compressed, the flow diagram 300 may proceed to step 316.

In step 316, the compressed video information generated by the blade video encoder 214, the audio information adapted by the blade audio bridge 216, and/or the peripheral output information received and adapted by the blade peripheral bridge 218 may be transferred to a TC machine 106 supported by the server blade 102 via the blade transceiver 220. When more than one TC machine 106 is supported by the server blade 102, the transceiver 220 may transfer the appropriate video, audio, and/or peripheral output information to the corresponding TC machine 106. In step 318, the server blade 102 may determine whether peripheral input information has been received from a TC machine 106. When no peripheral input information is received, the flow diagram 300 may proceed to step 320 where the server blade 102 may continue to send any remaining information until new or additional information is received from a TC machine 106 to be processed by software applications and/or the blade operating system. When the server blade 102 receives new or additional peripheral input information, the flow diagram 300 may proceed to step 322. In step 322, the blade transceiver 220 may transfer the received peripheral input information to the PC block 202 via the blade peripheral bridge 218 and the external bus protocol interface 210 for processing. After step 322, the flow diagram 300 may proceed to end step 324.

Figure 4A:
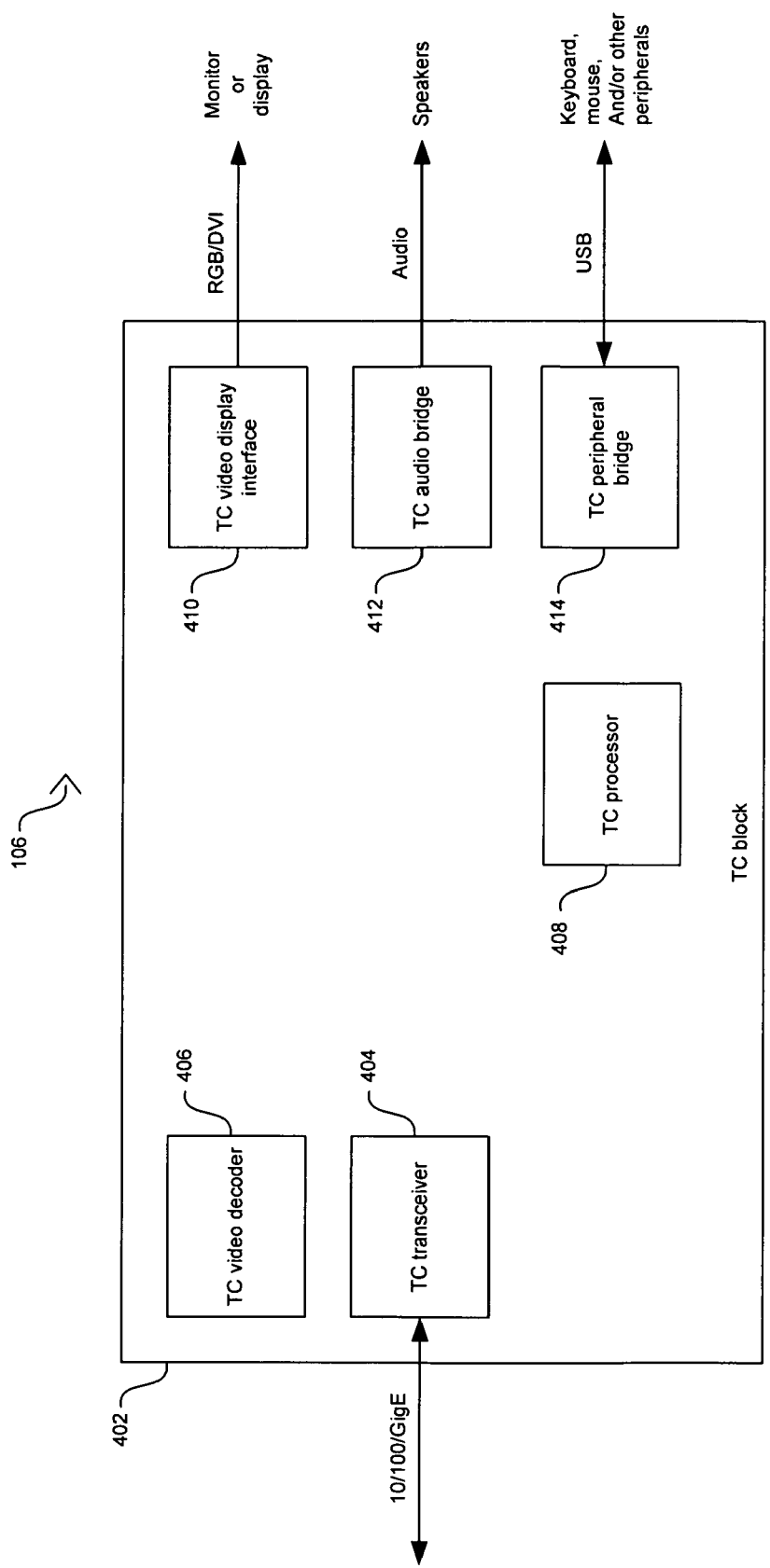
FIG. 4A is a block diagram of an exemplary TC machine implementation with an integrated transceiver, in accordance with an embodiment of the invention.

FIG. 4A is a block diagram of an exemplary TC machine with an integrated transceiver, in accordance with an embodiment of the invention. Referring to FIG. 4A, a TC machine 106 substantially as described in FIG. 1 may comprise a TC block 402. The TC block 402 may comprise a TC transceiver 404, a TC video decoder 406, a TC processor 408, a TC video display interface 410, a TC audio bridge 412, and a TC peripheral bridge 414. In some instances, at least a portion of the TC block 402 in FIG. 4A may be implemented in a SOC IC to provide a cost effective solution.

The TC transceiver 404 may comprise suitable logic, circuitry, and/or code that may be adapted to receive compressed video, audio, and/or peripheral output information, which has been adapted for transfer via the network 104. In this regard, the TC transceiver 404 may adapt and/or modify the format of the received information for transfer to the TC video decoder 406, the TC audio bridge 412, and/or the TC peripheral bridge 414. The TC transceiver 404 may utilize, for example, 10-Ethernet, 100-Ethernet, Gigabit Ethernet (GbE), or higher data rates, when receiving and/or transferring information. In this regard, MAC addresses and PHY layer standard (MAC/PHY) may be utilized by the TC transceiver 404 for communicating with the server blade 102. The TC transceiver 404 may also be adapted to receive peripheral input information from peripheral devices remotely communicatively coupled to the TC peripheral bridge 414. The TC transceiver 404 may adapt and/or modify the format of the received peripheral input information before transfer to the server blade 102. The TC transceiver 404 may utilize a communication protocol that adapts and/or modifies information for communicating with the server blade 102 that may operate independently of an operating system and/or applications running on the server blade 102. In this regard, the communication protocol supported by the TC transceiver 404 in FIG. 4A may also be supported by the blade transceiver 220 in FIGS. 2A-2B.

The TC video decoder 406 may comprise suitable logic, circuitry, and/or code that may be adapted to decode or decompress the compressed video information received from the TC transceiver 404. The video decompression function may be dynamic, that is, the decoding operation or algorithm may vary according to characteristics of the compressed video information received from the server blade 102 via the TC transceiver 404. Such a decoding operation or algorithm may be referred to as an adaptive decoding operation or algorithm. The TC video decoder 406 may also be adapted to transfer the decompressed video information to the TC video display interface 410. The TC video display interface 410 may comprise suitable logic, circuitry, and/or code that may be configured to adapt and/or modify the video information received from the TC video decoder 406 so that a monitor or display device may display the video information. In this regard, the TC video display interface 410 may format the video information in RGB format or DVI format, for example.

The TC audio bridge 412 may comprise suitable logic, circuitry, and/or code that may be adapted to process the audio information received from the TC transceiver 404 and to transfer the processed audio information to, for example, one or more speakers. Audio information may also be sent to any peripheral device capable of digital media storage, for example, an SD card, an XD card, flash card, or other device. The TC audio bridge 412 may adapt and/or modify the format of the audio information so that peripheral devices coupled to the TC machine 106 may utilize it. In some instances, the audio information may be compressed and the TC audio bridge 412, may be utilized to decompress the audio information.

The TC peripheral bridge 414 may comprise suitable logic, circuitry, and/or code that may be adapted to process the peripheral output information received from the TC transceiver 404 and to transfer the processed peripheral output information to peripheral devices. The TC peripheral bridge 414 may adapt and/or modify the format of the peripheral output information so that peripheral devices may utilize it. The TC peripheral bridge 414 may also be adapted to process peripheral input information received from the peripheral devices coupled to the TC machine 106 and to transfer the processed peripheral output information to the TC transceiver 404. The TC peripheral bridge 414 may adapt and/or modify the format of the peripheral input information received from the peripheral devices so that the TC transceiver 404 may utilize it. For example, the TC peripheral bridge 414 may utilize a standard USB interface to communicate with peripheral devices while converting the USB protocol to a format suitable for transport over the network 104 before the information is transferred to the TC transceiver 404.

The TC processor 408 may comprise suitable logic, circuitry, and/or code that may be adapted to initialize and operate the TC block 402. The TC processor 408 may utilize, for example, firmware for start-up, shutdown, and/or normal operations. Alternatively the TC processor 408 may utilize an embedded operating system for some of its functions. The TC processor 408 may utilize firmware and/or an embedded operating system that may be updated and/or adapted via the network 104 in FIG. 1 to perform these operations. The TC processor 408 may also initialize, configure, and/or maintain at least some of the operations performed by the TC transceiver 404, the TC video decoder 406, the TC video display interface 410, the TC audio bridge 412, and/or the TC peripheral bridge 414. In some instances, the TC processor 408 may communicate with the server blade 102 via the TC transceiver 404.

Figure 4B:
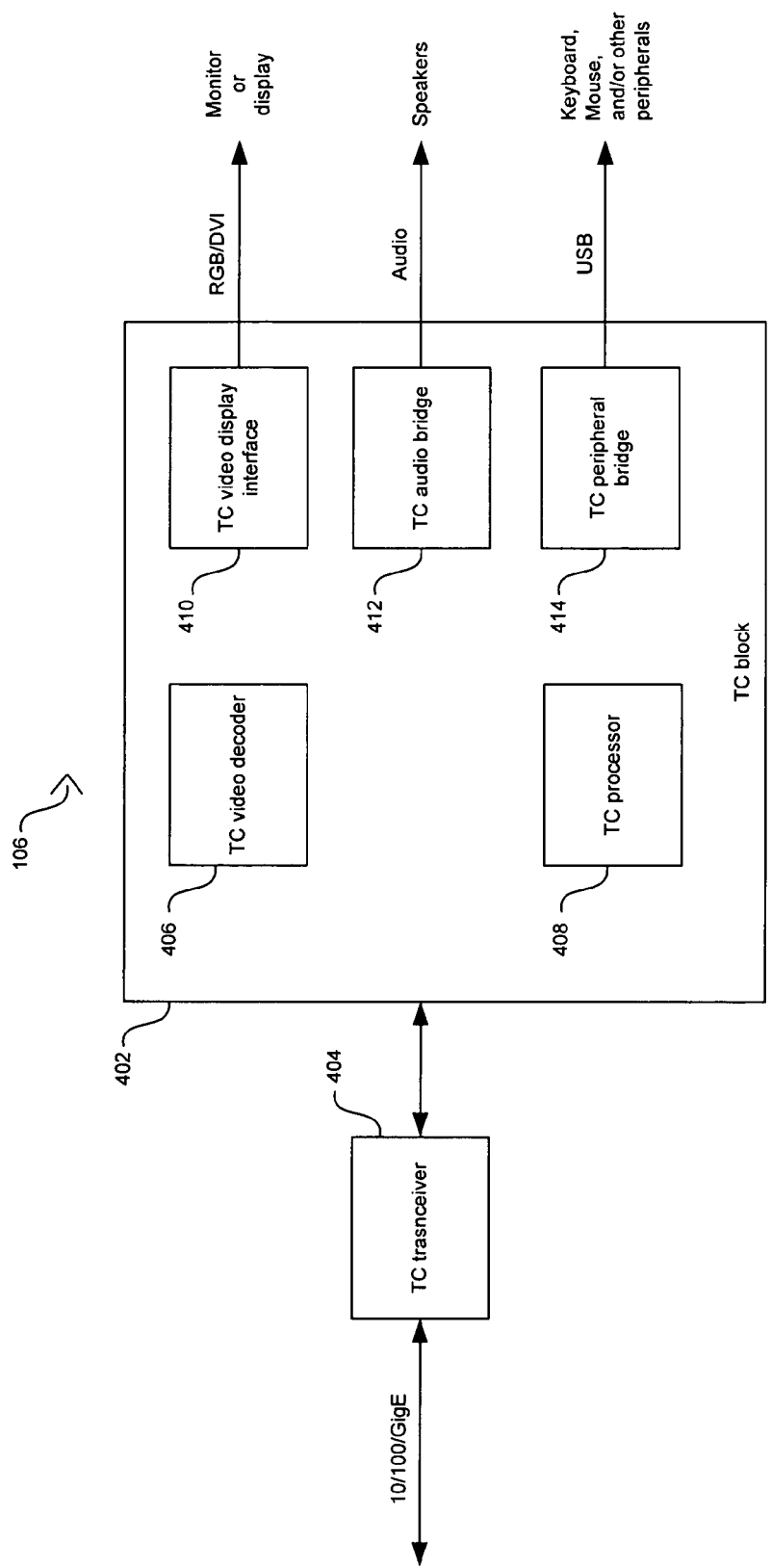
FIG. 4B is a block diagram of an exemplary TC machine implementation with a separate transceiver, in accordance with an embodiment of the invention.

FIG. 4B is a block diagram of an exemplary TC machine with a separate transceiver, in accordance with an embodiment of the invention. Referring to FIG. 4B, the TC block 402 in FIG. 4B may differ from the TC block 402 in FIG. 4A in that the TC transceiver 404 may be implemented separate from the TC block 402. The TC transceiver 404 may be adapted to provide both a suitable interface with the TC block 402 and with the network 104 in FIG. 1. In some instances, the TC block 402 in FIG. 4B may be implemented in an SOC IC to provide a cost effective solution.

Figure 4C:
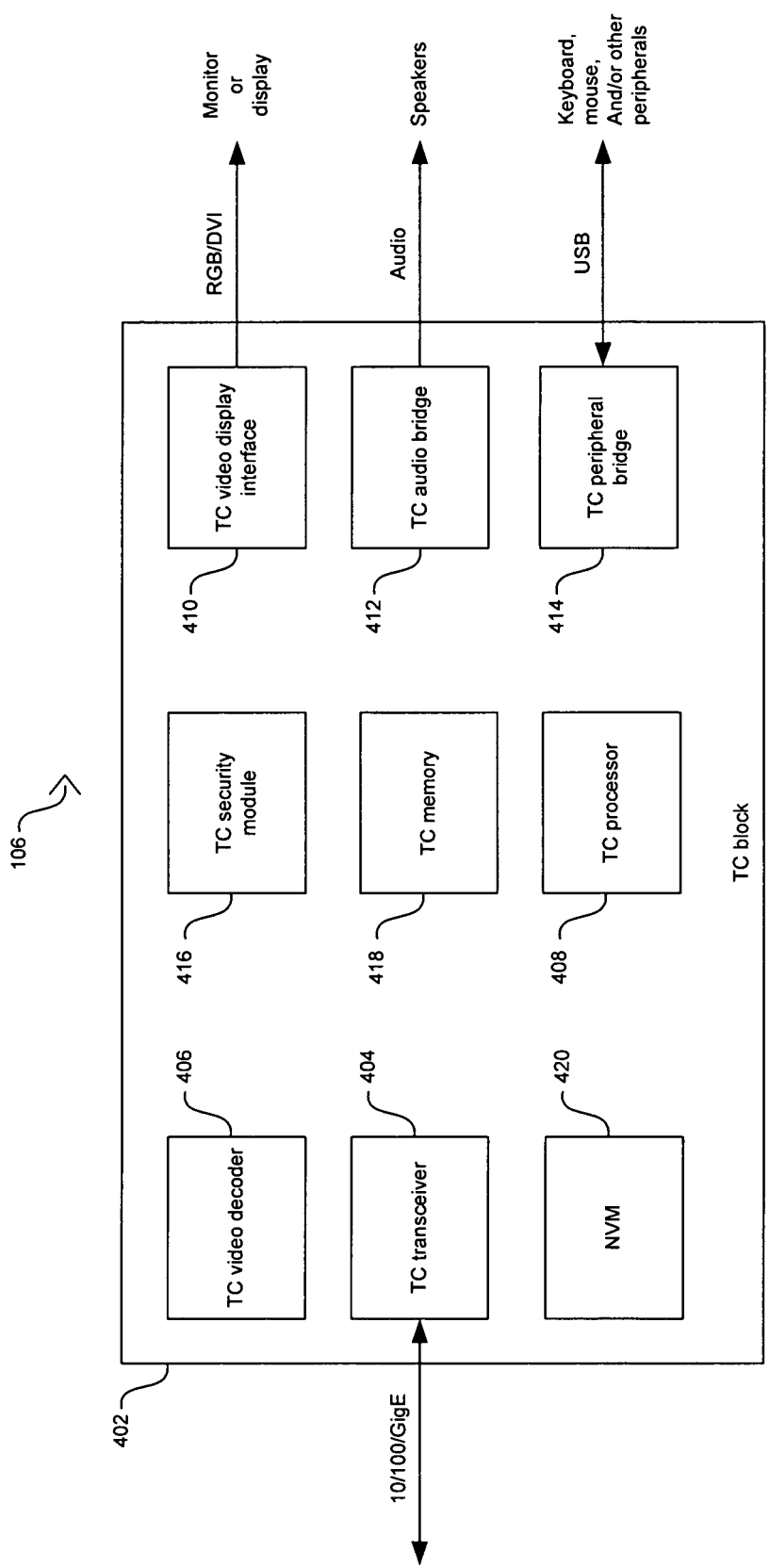
FIG. 4C is a block diagram of an exemplary TC machine implementation with a security module and an integrated transceiver, in accordance with an embodiment of the invention.

FIG. 4C is a block diagram of an exemplary TC machine implementation with a security module and an integrated transceiver, in accordance with an embodiment of the invention. Referring to FIG. 4C, the TC block 402 may comprise a TC security module 416, a TC memory 418, and a non-volatile memory 420. The TC memory 418 may comprise suitable logic, circuitry, and/or code that may be adapted to store information and/or data utilized and/or generated by data processing operations in the TC block 402. For example, the TC video decoder 406 may utilize a portion of the TC memory 418 during video decompression operations. The NVM 420 may comprise suitable logic, circuitry, and/or code that may be adapted to store information and/or data that may be available to the TC block 402. In this regard, the NVM 420 may be utilized for storing information utilized during start-up and/or shutdown operations, for example.

The TC security module 416 may comprise suitable logic, circuitry, and/or code that may be adapted to provide data security operations, such as encryption and/or encoding operations or authentication or creating root of trust. In this regard, the TC security module 416 may be adapted to operate in accordance with data security hardware and/or software that may be available in the server blade 102. Moreover, the TC transceiver 404 may utilize the TC security module 416 to authenticate the TC machine 106 to, for example, the third machine 105 when the third machine 105 may be adapted to grant network access and/or access to a particular application. In this regard, at least a portion of the TC security module 416 may be based on a trusted platform module (TPM). The TPM may be involved in storing a secret, a key or a certificate to create a trust relationship with the third machine 105 or with the blade. The TPM may be a cryptographically enhanced module for such operations with isolated and independent processing capabilities and with tamper proof protection. The security services provided by the TC security model 416 may be utilized to verify the authenticity and/or integrity of downloaded firmware, for example.

The TC block 402 may communicate, for example, the capabilities of the TC video decoder 406 and/or the TC audio bridge 412, during a configuration operation. Moreover, the TC block 402 may communicate the capabilities of the TC video decoder 406 and/or the TC audio bridge 412 during the exchange that occurs between the TC security module 416 and the third machine 105 when requesting access to the network 104 and/or a server blade 102, and/or during the exchange that occurs as part of the communication protocol negotiation between the TC machine 106 and the server blade 102. In some instances, the TC block 402 in FIG. 4C may be implemented in an SOC IC to provide a cost effective solution.

Figure 4D:
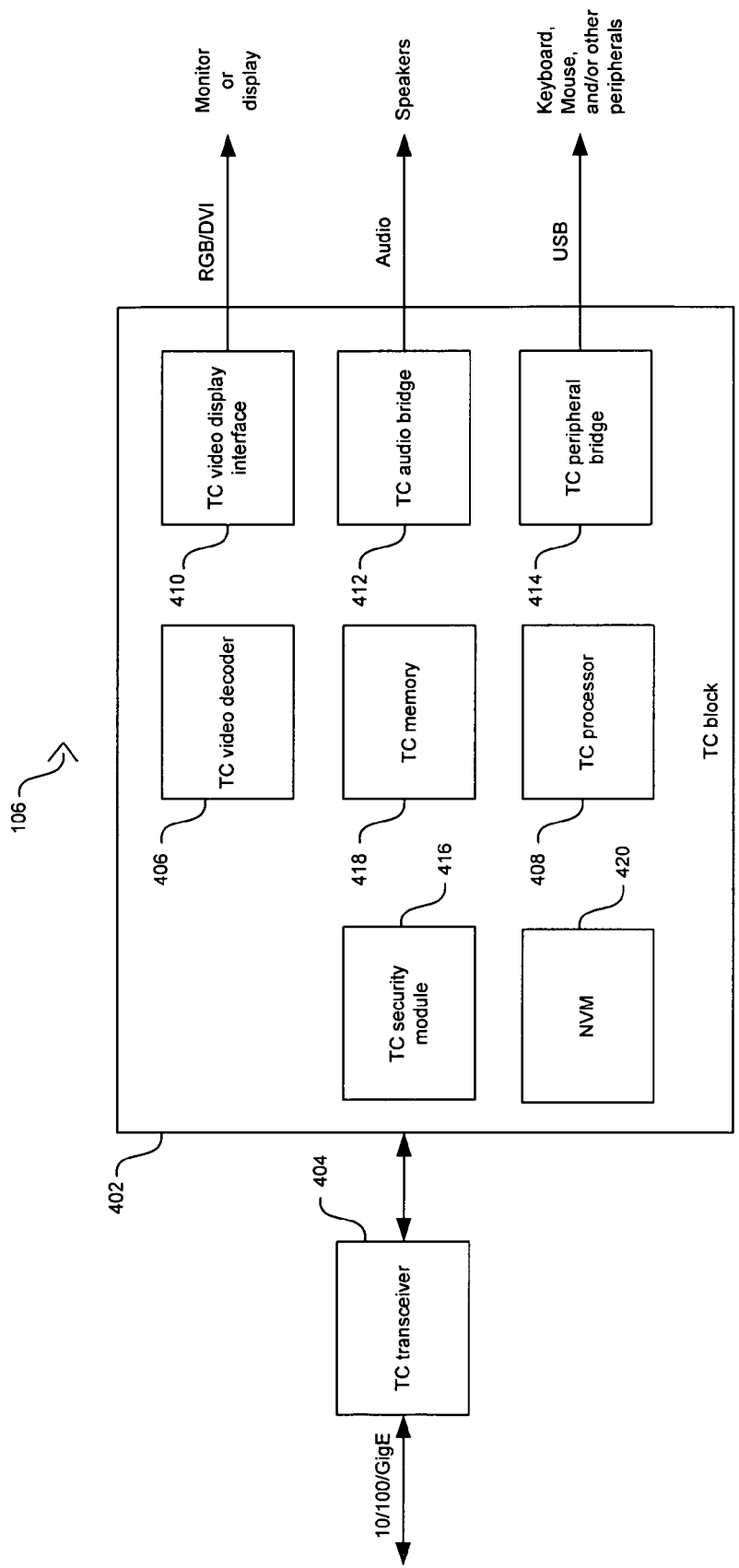
FIG. 4D is a block diagram of an exemplary TC machine implementation with a security module and a separate transceiver, in accordance with an embodiment of the invention.

FIG. 4D is a block diagram of an exemplary TC machine implementation with a security module and a separate transceiver, in accordance with an embodiment of the invention. Referring to FIG. 4D, the TC block 402 in FIG. 4D may differ from the TC block 402 in FIG. 4C in that the TC transceiver 404 may be implemented separate from the TC block 402. The TC transceiver 404 may be adapted to provide both a suitable interface with the TC block 402 and with the network 104 in FIG. 1. In some instances, the TC block 402 in FIG. 4D may be implemented in an SOC IC to provide a cost effective solution.

Figure 5:
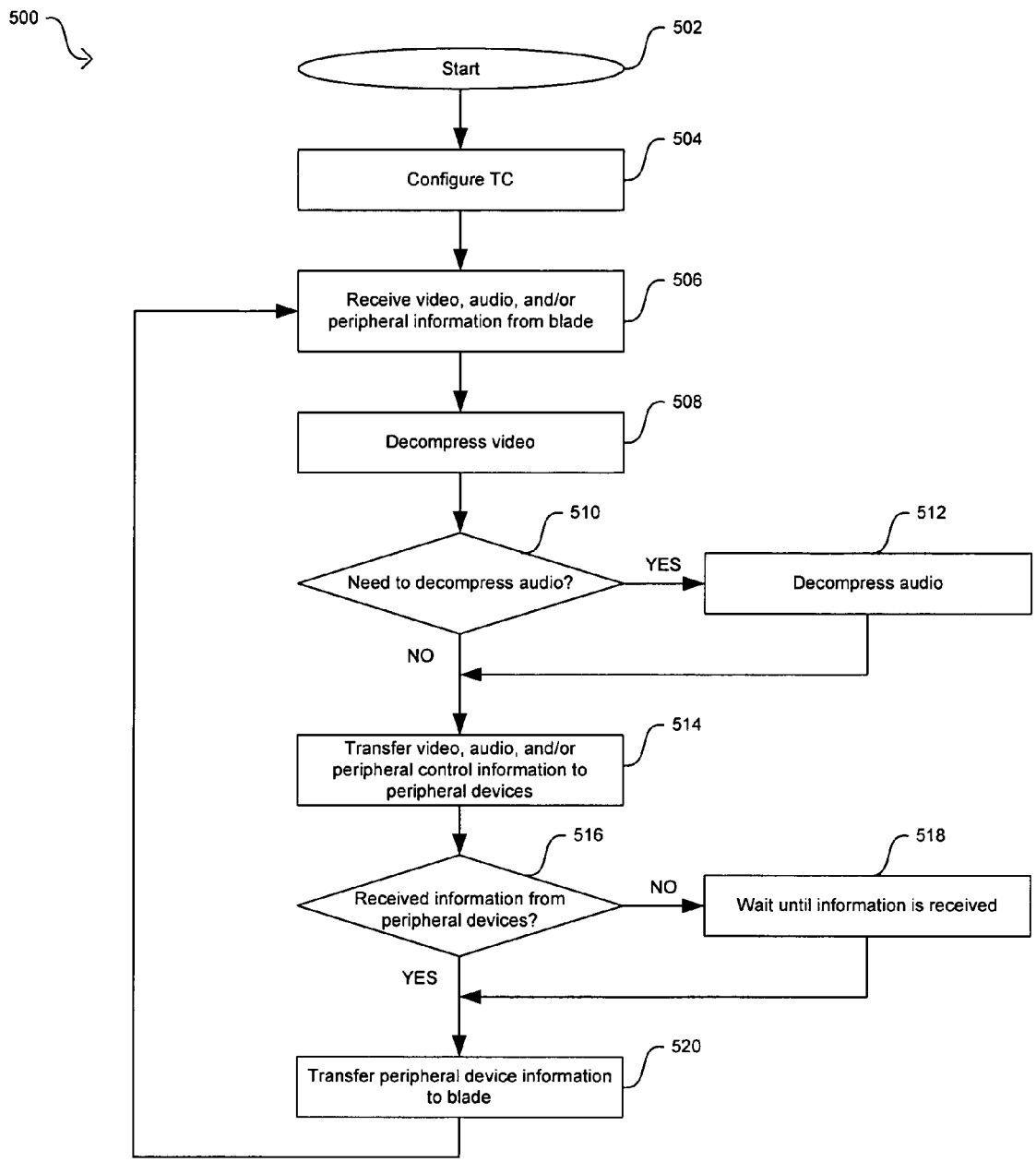
FIG. 5 is a flow diagram illustrating exemplary steps in the operation of a TC machine, in accordance with an embodiment of the invention.

FIG. 5 is a flow diagram illustrating exemplary steps in the operation of a TC machine, in accordance with an embodiment of the invention. Referring to FIG. 5, after start step 502, in step 504, the TC processor 408 may initialize or configure the operations of the TC block 402 by accessing the third machine 105 via the network 104 or by accessing configuration information stored in the NVM 420. For example, the TC processor 408 may configure the decompression of video information and/or the adaptation and/or modification of video, audio, and/or peripheral information. Configuration and management of the TC block 402 by the TC processor 408 and/or by the third machine 105 may occur at various instances during the operation of the TC machine 106.

In step 506, the TC transceiver 404 may receive compressed video information, audio information, and/or peripheral output information from the server blade 102. The TC transceiver 404 may transfer the received compressed video information to the TC video encoder 406, the received audio information to the TC audio bridge, and the received peripheral input information to the TC peripheral bridge 414. In step 508, the TC video decoder 406 may decompress or decode the compressed video information received from the TC transceiver 404.

In step 510, the TC machine 106 may be adapted to determine whether the received audio information is compressed and may need to be decompressed. When audio information is to be decompressed, the flow diagram 500 may proceed to step 512 where either the TC audio bridge 412, for example, has been adapted to perform decompression of the audio information. When the audio decompression is complete, the flow diagram 500 may proceed to step 514. When audio information is not compressed, the flow diagram 500 may proceed to step 514.

In step 514, the decompressed video information generated by the TC video decoder 406 and received by the TC video display interface 410 may be transferred to the video peripheral device such as a monitor or display, for example. The audio information received and adapted by the TC audio bridge 412 may be transferred to audio peripheral devices such as one or more speakers, for example. Moreover, the peripheral output information received and adapted by the TC peripheral bridge 414 may be transferred to peripheral devices. In step 516, the TC machine 106 may determine whether peripheral input information has been received from the peripheral devices. Such information may be from a keyboard, a mouse, an audio source, and/or or a video source, such as a webcam, for example. When the TC machine 106 is adapted to support these services, the audio and/or video information received may be compressed before submitting to the TC transceiver 404 for transmission to the server blade 102. When no peripheral input information is received, the flow diagram 500 may proceed to step 518 where the TC machine 106 may continue to send any remaining and/or update peripheral output information to the peripheral devices until new or additional peripheral input information is received. When the TC machine 106 receives new or additional peripheral input information, the flow diagram 500 may proceed to step 520. In step 520, the TC transceiver 404 may transfer the peripheral input information received from the TC peripheral bridge 414 to the server blade 102 for processing. After step 520, the flow diagram 500 may proceed to end step 522.

Unlike a dummy terminal or a traditional PC thin client architecture, the approach described herein provides a blade/TC architecture where the thin client's design and operation are independent of the choice of operating system and application software in the blade, and where video information may be communicated quite effectively by compressing the information. In this architecture, a common protocol, such as RDP or ICA, may not be necessary. Updates to the server blade operating system may be carried out without a need to update the common protocol to maintain compatibility. Moreover, because updates to the common protocol may not be necessary and compatibility issues do not arise, upgrades to the thin client software and hardware may not be as frequent.

In some instances, absence of an operating system and/or application code on the TC machine 106, may eliminate the need for maintenance, support, and/or service by technical staff. In this regard, the cost of the TC machine 106 may be sufficiently low to enable a business model where in the rare case of a failure, a replacement may be cheaper than servicing the failed unit. The extreme integration, minimal power, and/or size requirements of a TC machine 106 may enable it to be placed in locations where a typical PC may not be able to fit. This small form factor also enables the integration of a TC machine 106 in one of the peripherals, for example, within a monitor, creating a new device with new capabilities.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating and handling information, the method comprising:
    in a thin client:
        receiving compressed video information and peripheral devices output information via an Ethernet connection;
        decompressing said received compressed video information;
        modifying said received peripheral devices output information for communication to a first peripheral device that is remotely coupled to said thin client;
        communicating said modified peripheral devices output information to said first peripheral device; and
        communicating said decompressed video information to a second peripheral device remotely coupled to said thin client.

2. The method according to claim 1, comprising receiving via said Ethernet connection audio information by said thin client.

3. The method according to claim 2, comprising transferring said received audio information to a third peripheral device that is remotely coupled to said thin client.

4. The method according to claim 3, comprising receiving peripheral devices input information by said thin client from at least one of said first peripheral device, said second peripheral device and said third peripheral device.

5. The method according to claim 4, comprising transferring via said Ethernet connection at least a portion of said received peripheral devices input information to a server.

6. The method according to claim 1, wherein at least one control signal is generated by a processing device to control a thin client interface coupled to said thin client when said thin client interface interfaces to a plurality of thin clients.

7. The method according to claim 6, wherein information is communicated between said processing device and external storage via an Internet small computer system interface (iSCSI) interface.

8. The method according to claim 6, wherein information is communicated between said processing device and external storage via a remote direct memory access (RDMA) interface.

9. The method according to claim 1, wherein information is communicated between said processing device and external storage and at least one thin client via a transceiver.

10. The method according to claim 1, comprising, in said thin client, communicating via said Ethernet connection with a processing device, wherein said thin client and said processing device each utilizes one or both of a communication protocol and an operating system which operates independently from each other.

11. A method comprising:
in a processing device:
generating video information;
compressing said generated video information;
communicating said compressed generated video information onto an Ethernet connection;
generating peripheral devices output information;
modifying said peripheral devices output information for communication over said Ethernet connection; and
communicating said modified peripheral devices output information onto said Ethernet connection to one or more peripheral devices remotely coupled to said processing device.

12. The method according to claim 11, comprising compressing said generated video information based on network capacity.

13. The method according to claim 11, comprising compressing said generated video information based on video content.

14. The method according to claim 11, comprising providing permission to install a peripheral device remotely communicatively coupled to a thin client and said permission is based on at least a portion of peripheral devices input information received from said thin client by said processing device via said Ethernet connection.

15. The method according to claim 11, comprising providing permission to install a peripheral device remotely communicatively coupled to a thin client and said permission is based on at least a portion of peripheral devices input information received from said thin client by a security machine via said Ethernet connection.

16. The method according to claim 11, comprising, in said processing device, communicating via said Ethernet connection with a thin client, wherein said thin client and said processing device each utilizes one or both of a communication protocol and an operating system which operates independently from each other.

17. A system comprising:
one or more circuits for a thin client, said one or more circuits being configured to:
receive compressed video information and peripheral devices output information via an Ethernet connection;
decompress said received compressed video information;
adapt said received peripheral devices output information for communication to a first peripheral device that is remotely coupled to said thin client;
communicate said adapted peripheral devices output information to said first peripheral device; and
communicate said decompressed video information to a second peripheral device remotely coupled to said thin client.

18. The system according to claim 17, wherein said one or more circuits receive audio information via said Ethernet connection.

19. The system according to claim 18, wherein said one or more circuits are configured to transfer said received audio information to a third peripheral device that is remotely coupled to said thin client.

20. The system according to claim 17, wherein said thin client is operable to communicate via said Ethernet connection with a processing device, wherein said thin client and said processing device each utilizes one or both of a communication protocol and an operating system which operates independently from each other.

21. A system comprising:
one or more circuits of a processing device, said one or more circuits being configured to:
generate video information;
compress said generated video information;
communicate said compressed video information onto an Ethernet connection;
generate peripheral devices output information;
adapt said peripheral devices output information for communication over said Ethernet connection; and
communicate said adapted peripheral devices output information onto said Ethernet connection to one or more peripheral devices remotely coupled to said processing device.

22. The system according to claim 21, wherein said one or more circuits are configured to receive said video information from a graphics generator via a digital video interface.

23. The system according to claim 21, wherein said one or more circuits are configured to compress said video information based on network capacity.

24. The system according to claim 21, wherein said one or more circuits are configured to compress said video information based on video content.

25. The system according to claim 21, wherein said one or more circuits comprise an audio bridge that processes audio information.

26. The system according to claim 25, wherein said one or more circuits are configured to transfer said processed audio information to a thin client via said Ethernet connection.

27. The system according to claim 21, wherein said one or more circuits comprise a peripheral bridge that is configured to process at least one of: peripheral devices output information to be transferred to a thin client that is remotely coupled to said thin client and peripheral devices input information received from said thin client.

28. The system according to claim 27, wherein said one or more circuits are configured to transfer said processed peripheral devices output information to said thin client via said Ethernet connection.

29. The system according to claim 27, wherein said one or more circuits are configured to receive peripheral devices input information from said thin client via said Ethernet connection.

30. The system according to claim 21, wherein said one or more circuits of said processing device are operable to communicate via said Ethernet connection with a thin client, wherein said thin client and said processing device each utilizes one or both of a communication protocol and an operating system which operates independently from each other.

* * * * *